United States Patent
Kim et al.

(10) Patent No.: US 8,504,037 B2
(45) Date of Patent: Aug. 6, 2013

(54) HANDOVER METHOD AND APPARATUS BASED ON HISTORY INFORMATION IN WIRELESS NETWORKS

(75) Inventors: Tae Hoon Kim, Daejeon (KR); Youngnam Han, Daejeon (KR); Yonghoon Choi, Seoul (KR); Deokhoon Lee, Incheon (KR); Duck Hee Han, Gyeonggi-do (KR)

(73) Assignee: Korea Advanced Institute of Science and Technology (Kaist), Daejeon (KR)

( * ) Notice: Subject to any disclaimer, the term of this patent is extended or adjusted under 35 U.S.C. 154(b) by 1241 days.

(21) Appl. No.: 12/190,842

(22) Filed: Aug. 13, 2008

(65) Prior Publication Data
US 2010/0041404 A1 Feb. 18, 2010

(51) Int. Cl.
*H04W 4/00* (2009.01)

(52) U.S. Cl.
USPC .......................................... 455/436; 370/331

(58) Field of Classification Search
USPC .. 455/436, 443, 441, 440, 452, 522; 370/331, 370/338
See application file for complete search history.

(56) References Cited

U.S. PATENT DOCUMENTS

| | | | |
|---|---|---|---|
| 2005/0141453 A1* | 6/2005 | Zhu | 370/331 |
| 2009/0006541 A1* | 1/2009 | Baba et al. | 709/203 |
| 2009/0017823 A1* | 1/2009 | Sachs et al. | 455/437 |
| 2009/0122763 A1* | 5/2009 | Oguchi | 370/331 |
| 2010/0020764 A1* | 1/2010 | Yamamoto et al. | 370/331 |

FOREIGN PATENT DOCUMENTS

| JP | 2002-016958 | * | 1/2002 |
|---|---|---|---|
| JP | 2004-289226 | * | 10/2004 |

* cited by examiner

*Primary Examiner* — Nizar Sivji
(74) *Attorney, Agent, or Firm* — Bacon & Thomas, PLLC

(57) ABSTRACT

A handover method in a plurality of wireless networks includes selecting one or more candidate networks from the plurality of wireless networks available to a mobile terminal of a user; calculating the latest connection time with a serving network currently serving the mobile terminal; deriving a history utility function based on the latest connection time; deriving system utility functions of the candidate networks in consideration of user and system environments; deriving selection functions for the candidate networks using the history utility function and the system utility functions; and selecting one of the candidate networks as a target network for handover using the selection functions. A target network for handover is selected using not only a system utility function reflecting user and system parameters but also a history utility function reflecting history information, thereby reducing the number of handovers and enhancing service quality.

11 Claims, 4 Drawing Sheets

HANDOVER METHOD AND APPARATUS BASED ON HISTORY INFORMATION IN WIRELESS NETWORKS

FIELD OF THE INVENTION

The present invention relates to a handover method and apparatus in multiple wireless networks and, more particularly, to a handover method and apparatus which are capable of selecting an optimal network service and providing it to a mobile terminal located in an area where two or more overlapping wireless networks are co-existed.

BACKGROUND OF THE INVENTION

In recent years, wireless networks take a form of an overlay network in which a plurality of wireless networks, e.g., a radio access network for high-speed data transmission, a broadband cellular network, and a local area network (LAN) are co-existed and thus their service areas overlap.

In such an overlay network environment, to provide a seamless service to a mobile terminal from an optimal network regardless of the location of the mobile terminal, it is necessary to provide a vertical handover technique that enables the mobile terminal to select an optimal one of the multiple networks and connect to the optimal network.

SUMMARY OF THE INVENTION

It is, therefore, an object of the present invention to provide a handover method and apparatus that select an optimal network for a vertical handover satisfying requirements of user environment and required service quality.

In accordance with an aspect of the present invention, there is provided a handover method in a plurality of wireless networks, including: selecting one or more candidate networks from the plurality of wireless networks available to a mobile terminal of a user; calculating the latest connection time with a serving network currently serving the mobile terminal; deriving a history utility function based on the latest connection time; deriving system utility functions of the candidate networks in consideration of user and system environments; deriving selection functions for the candidate networks using the history utility function and the system utility functions; and selecting one of the candidate networks as a target network for handover using the selection functions.

In accordance with another aspect of the present invention, there is provided a handover apparatus in a plurality of wireless networks, including: a first selector selecting one or more candidate networks from the plurality of wireless networks available to a mobile terminal of a user; a connection time calculator calculating the latest connection time with a serving network currently serving the mobile terminal; a history utility function composer deriving a history utility function based on the latest connection time; a system utility function composer deriving system utility functions for the candidate networks in consideration of user and system environments; a selection function composer deriving selection functions for the candidate networks using the history utility function, the system utility functions, and the latest connection time; and a second selector selecting one of the candidate networks as a target network for handover using the selection functions.

In accordance with further another aspect of the present invention, there is provided a computer-readable medium storing a computer-executable program that directs a computer to execute the above method.

In the handover method of the present invention, a history utility function is defined in consideration of a user environment and a latest connection time with the serving network, and a target network for handover is selected using the history utility function. Thus, the number of unnecessary handovers and system load are reduced and performance for the user and system is enhanced.

BRIEF DESCRIPTION OF THE DRAWINGS

The above and other objects and features of the present invention will become apparent from the following description of embodiments given in conjunction with the accompanying drawings, in which.

DETAILED DESCRIPTION OF THE EMBODIMENTS

Hereinafter, embodiments of the present invention will be described in detail with reference to the accompanying drawings so that they can be readily implemented by those skilled in the art.

Figure 1:
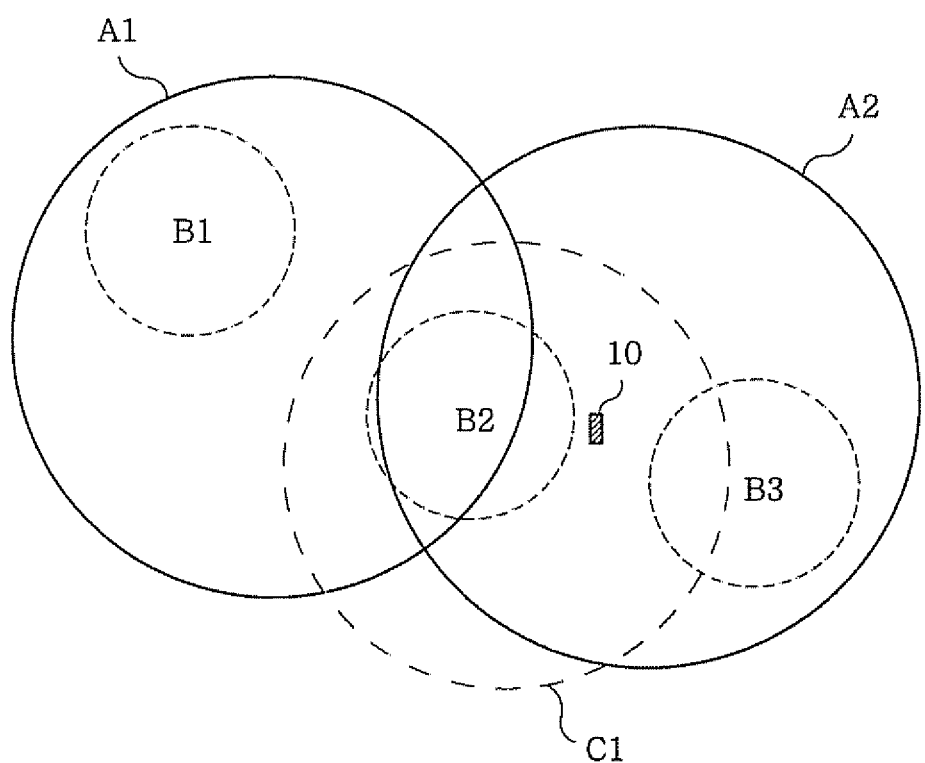
FIG. 1 is a diagram illustrating overlapping of multiple wireless networks.

FIG. 1 is a diagram illustrating overlapping of multiple wireless networks. As illustrated in FIG. 1, a plurality of wireless networks may overlap with each other depending upon locations of their base stations. That is, a mobile terminal 10 of a user may be located on multiple wireless networks employing different wireless technologies, or be located in multiple overlapping cells of a single wireless network.

The multiple wireless networks may include a wireless network for high-speed data transmission such as WiBro (Wireless Broadband), WiFi (Wireless Fidelity) and WiMAX; a broadband cellular network such as WCDMA (Wideband Code Division Multiple Access) and GSM (Global System for Mobile communication); and a wireless local area network (WLAN).

In FIG. 1, two base stations managing wireless cells A1 and A2 provide network services of a wireless network A. Three base stations managing wireless cells B1, B2 and B3 provide network services of a wireless network B. A base station managing a wireless cell C1 provides network services of a wireless network C.

The mobile terminal 10 is located in an area where the wireless cells A2 and C1 overlap with each other, and thus may access the wireless networks A and C.

Therefore, the mobile terminal 10 may be a wireless telephone, a cellular telephone, a personal digital assistant, a personal computer, or any other device that is capable of sending and receiving communication signals on wireless networks, all of which have a multi-mode capability that has an interface for supporting two or more wireless technologies used for communication in the overlay network.

Figure 2:
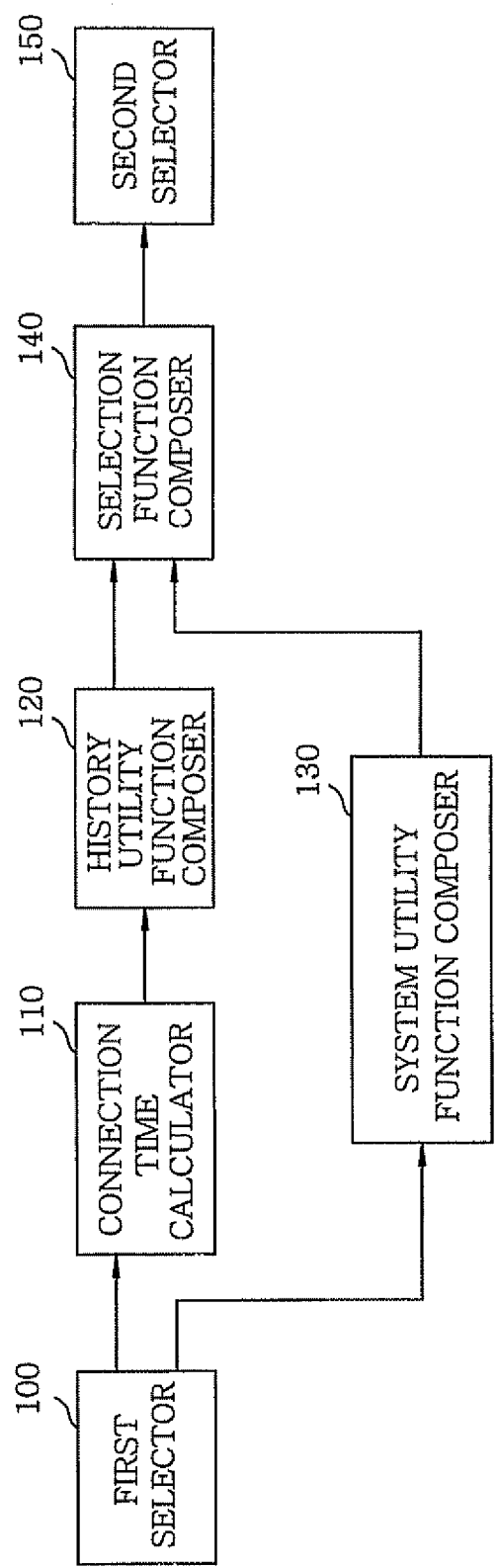
FIG. 2 is a block diagram illustrating a handover apparatus in accordance with an embodiment of the present invention.

FIG. 2 is a block diagram illustrating a handover apparatus in accordance with an embodiment of the present invention. The handover apparatus may be installed at base stations of individual wireless networks. The handover apparatus includes a first selector 100, a connection time calculator 110, a history utility function composer 120, a system utility function composer 130, a selection function composer 140, and a second selector 150.

The first selector 100 selects candidate networks meeting minimum conditions as a handover target network from the wireless networks available to the mobile terminal 10 of the user. More specifically, the first selector 100 searches for the wireless networks to create a list of candidate networks available to the mobile terminal 10 for handover. At this time, those wireless networks not meeting the minimum conditions are excluded, and thus the number of candidate networks and computation tasks required for handover are reduced accordingly.

The connection time calculator 110 calculates the latest connection time between the mobile terminal 10 and a serving network currently providing wireless services to the mobile terminal 10. In this regard, the latest connection time refers to the time elapsed to the present time from the beginning of the wireless connection made with the serving network. For, example, if the wireless connection at present has been made through a vertical handover, the latest connection time becomes the time elapsed from the completion of the handover to the present time.

The history utility function composer 120 derives a history utility function based on the latest connection time, and computes the value of the history utility function by substituting the latest connection time calculated by the connection time calculator 110 with the history utility function. In addition, the system utility function composer 130 derives system utility functions of the individual candidate networks, and computes the value of the system utility function of each candidate network.

The system utility function of a candidate network indicates a satisfaction level of the user to the candidate network in terms of user and network environments. The history utility function based on the latest connection time means a function based on the latest connection time to the serving network, and the value thereof decreases as the latest connection time increases.

When the latest connection time of the mobile terminal 10 with the serving network is short, a corresponding history utility function gives a relatively large value, which results in reducing the number of unnecessary handovers to other networks.

Equation 1 is an example of a history utility function based on the latest connection time.

$$U_i^H(n,t,v,s,w)=e^{-at}\cdot U(T_{min}-t)$$ [Equation 1]

Equation 1 denotes a history utility function associated with the i-th network, 'n' is the number of handovers performed so far, 't' is the latest connection time, 'v' is the moving velocity of the mobile terminal 10, 's' is the type of a service by which the user is being served, and 'w' is the type of a serving network currently serving the mobile terminal. The history utility function is evaluated using these parameters. The type of a service may be a real-time service such as a voice service or streaming service, or be a non real-time service such as an FTP service.

In Equation 1, the term $U(T_{min}-t)$ is a function of the is latest connection time 't', and $T_{min}$ is a minimum criteria value for the time needed to surely receive a service from a network, which may be given by the user or the network. When the user has received a service from the serving network for duration longer than or equal to $T_{min}$, this function $U(T_{min}-t)$ makes the value of the history utility function zero, which means the selection of candidate network is not affected by the history utility function. That is, if the mobile terminal 10 has received a service from the serving network for a duration shorter than $T_{min}$, the calculated value of the history utility function has influence on a selection function for network (NSF); and if the terminal has received a service from the serving network for a duration longer than $T_{min}$, the calculated value of the history utility function has no influence on the network selection function.

Equation 1 has a nonzero value in relation only to the serving network currently serving the mobile terminal 10, and has a value of zero in relation to other networks.

Figure 4:
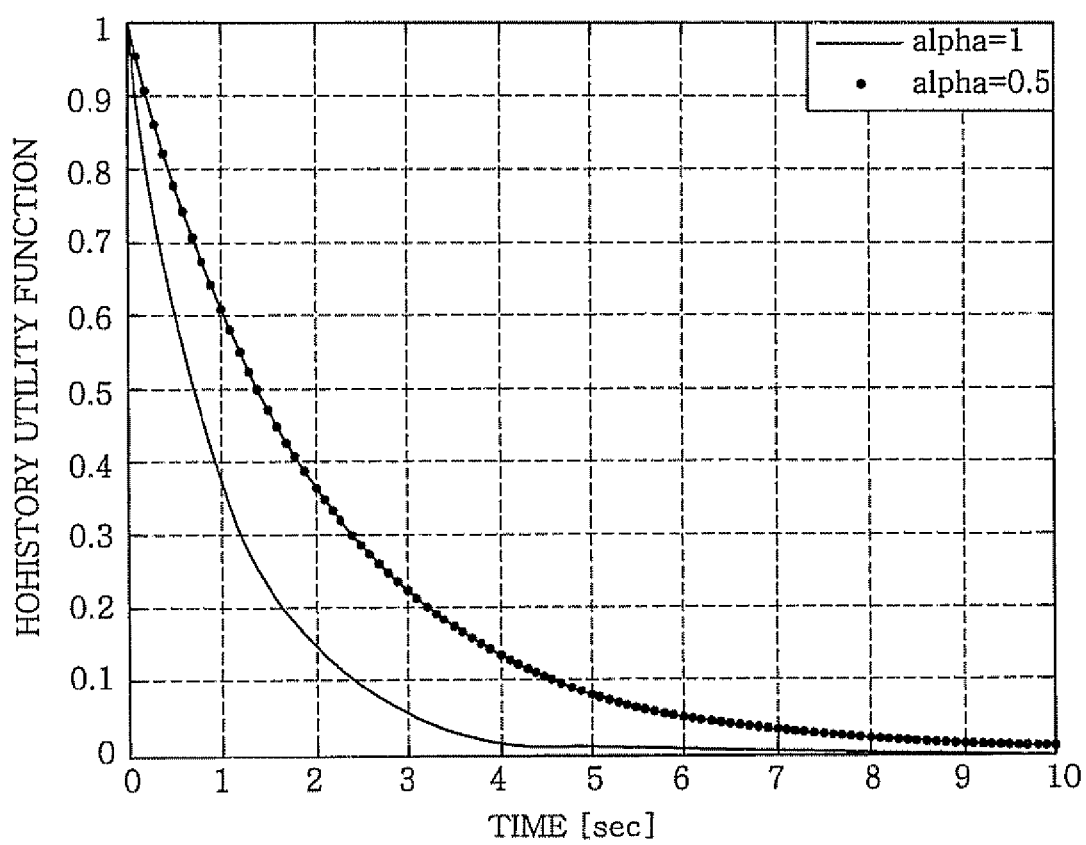
FIG. 4 is graphs of history utility functions versus latest connection times.

The value of Equation 1 decreases with the time elapsed, and the decrement differs depending on the value of α(alpha). The handover sensitivity to the latest connection time incurred by a vertical handover can be adjusted by varying the value of α as illustrated in FIG. 4, which illustrates varying values of history utility functions having different values of a with the passage of time.

The selection function composer 140 derives the selection function (NSF) for network using the latest connection time calculated by the connection time calculator 110, the history utility function composer 120, and system utility functions of the candidate networks.

An example of the selection function for network is represented as Equation 2.

$$NSF_i=U_i(\bullet)+\eta\cdot U_i^H(\bullet),\forall i$$ [Equation 2]

The selection function for network is used to select one of the candidate networks as a target network for a vertical handover.

In Equation 2, $U_i(\cdot)$ is a system utility function reflecting system parameters such as capacity, delay, path loss and monetary cost, and user preferences for the system parameters. $U_i^H(\cdot)$ is a history utility function represented by Equation 1. η acts as a weighting factor to adjust an weight between the system utility function and the history utility function. For example, if it is desired to increase the influence of the history information such as the number of handovers performed, η is set to a relatively large value; and to decrease the influence of the history information, η is set to a value close to zero.

The second selector 150 selects one of the candidate networks as a target network for handover using the selection functions. The selected candidate network has the greatest selection function value computed from the selection function composer 140.

Figure 3:
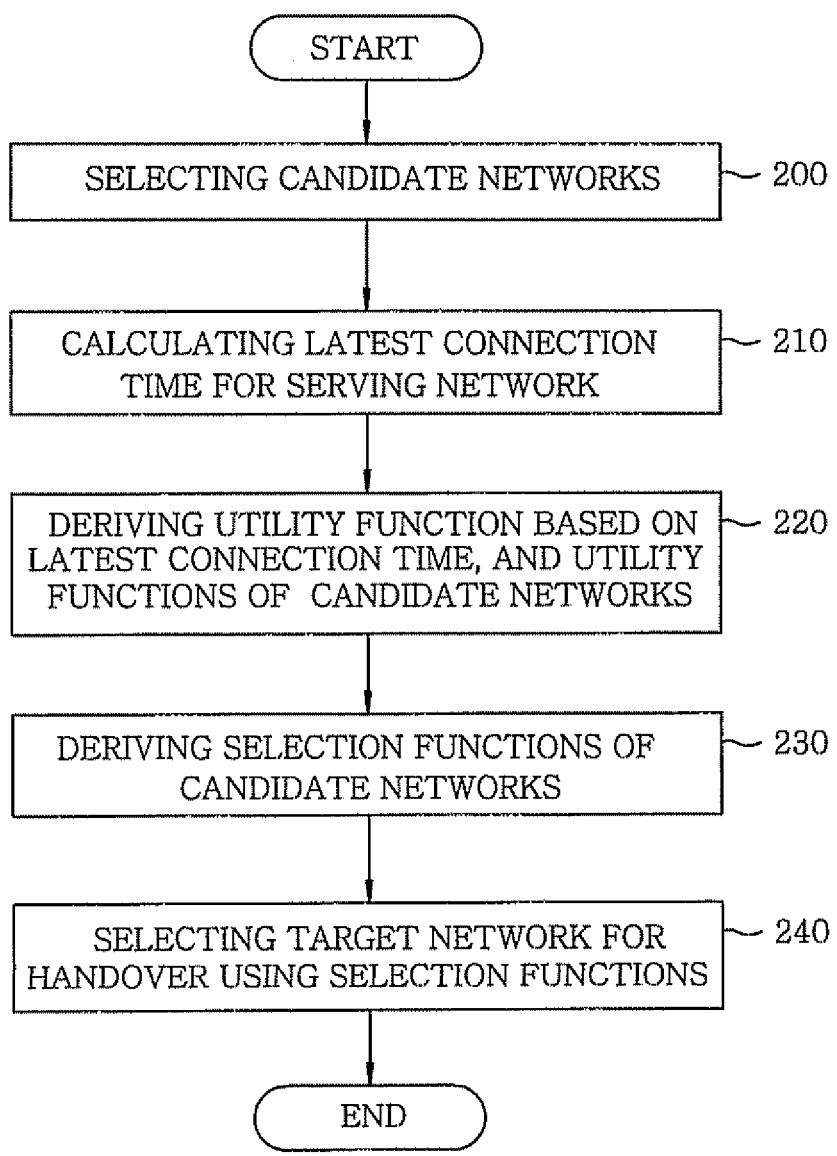
FIG. 3 is a flow chart illustrating a handover method performed in the handover apparatus shown in FIG. 2 in accordance with an embodiment of the present invention.

The operation of the handover apparatus of FIG. 2 is described in connection with the flow chart of FIG. 3 illustrating a handover method according to another embodiment of the present invention.

At step 200, first of all, one or more candidate networks are selected as a handover target network from the wireless networks available to the mobile terminal 10 by the first selector 100.

Next, at step 210, a latest connection time between the mobile terminal 10 and a serving network currently providing a wireless service to the mobile terminal 10 is calculated by the connection time calculator 110.

Thereafter, at step 220, a history utility function is derived by the history utility function composer 120 based on the latest connection time, and the value of the history utility function is calculated by the connection time calculator 110.

Subsequently, at step 220, system utility functions of the individual candidate networks are derived, and the value of the system utility function of each candidate network are calculated by the system utility function composer 130.

After that, at step 230, the selection function (NSF) for network is derived by the selection function composer 140 using the latest connection time calculated at step 210, the history utility function derived at step 220, and the system utility functions of the candidate networks.

And then, at step 240, one of the candidate networks is selected as a target network for a vertical handover using the selection functions. The selected candidate networks have the greatest selection function value computed from the selection function represented by Equation 2.

Therefore, the mobile terminal 10 can continuously receive seamless services from the selected target network.

In addition, the present invention may be implemented as computer-executable codes stored in a computer-readable storage medium. The computer-readable storage medium may be any of storage media that can store data readable by a computer system. Examples of the computer-readable storage medium include a ROM, RAM, CD-ROM, magnetic tape, floppy disk, optical data storage, and carrier wave (for transmission through the Internet). The computer-executable codes or the computer-executable program may be distributed among and executed by computer systems connected through a network to carry out the functions of the present invention in a distributed manner.

While the invention has been shown and described with respect to the preferred embodiments, it will be understood by those skilled in the art that various changes and modifications may be made without departing from the scope of the invention as defined in the following claims.

What is claimed is:

1. A handover method in a plurality of wireless networks, comprising:
    selecting one or more candidate networks from the plurality of wireless networks available to a mobile terminal of a user;
    calculating the latest connection time with a serving network currently serving the mobile terminal;
    deriving a history utility function based on the latest connection time;
    deriving system utility functions of the candidate networks in consideration of the user and system environments;
    deriving selection functions for the candidate networks using the history utility function and the system utility functions; and
    selecting one of the candidate networks having the greatest selection function value as a target network for handover using the selection functions,
    wherein the latest connection time indicates the time elapsed to the present time from a completion of a last handover of the mobile terminal to the serving network,
    wherein a value of the history utility function for the serving network decreases as the latest connection time increases and a value of the history utility function for wireless networks other than the serving network is zero,
    wherein the system utility functions indicate satisfaction levels of the user to the respective candidate networks and are determined based on the system environments including capacity, delay, path loss and monetary cost of the respective candidate networks and user preferences for the system environments, and
    wherein the selection function for each of the candidate networks is a linear combination of the system utility function for said each of the candidate networks and the history utility function.

2. The handover method of claim 1, wherein the candidate networks include heterogeneous wireless networks.

3. The handover method of claim 2, wherein the heterogeneous wireless networks include at least two of WiBro (Wireless Broadband), WiFi (Wireless Fidelity), WiMAX (Worldwide Interoperability for Microwave Access), WCDMA (Wideband Code Division Multiple Access), GSM (Global System for Mobile communication) and WLAN (Wireless Local Area Network).

4. The handover method of claim 1, wherein the history utility function is based on a number of handovers performed so far, the latest connection time, a moving velocity of the mobile terminal, a type of a service by which the user is being served and a type of the serving network.

5. A handover apparatus in a plurality of wireless networks, comprising:
    a first selector selecting one or more candidate networks from the plurality of wireless networks available to a mobile terminal of a user;
    a connection time calculator calculating the latest connection time with a serving network currently serving the mobile terminal;
    a history utility function composer deriving a history utility function based on the latest connection time;
    a system utility function composer deriving system utility functions for the candidate networks in consideration of user and system environments;
    a selection function composer deriving selection functions for the candidate networks using the history utility function and the system utility functions; and
    a second selector selecting one of the candidate networks having the greatest selection function value as a target network for handover using the selection functions,
    wherein the latest connection time indicates the time elapsed to the present time from a completion of a last handover of the mobile terminal to the serving network,
    wherein a value of the history utility function for the serving network decreases as the latest connection time increases and a value of the history utility function for wireless networks other than the serving network is zero,
    wherein the system utility functions indicate satisfaction levels of the user to the respective candidate networks and are determined based on the system environments including capacity, delay, path loss and monetary cost of the respective candidate networks and user preferences for the system environments, and
    wherein the selection function for each of the candidate networks is a linear combination of the system utility function for said each of the candidate networks and the history utility function.

6. The handover apparatus of claim 5, wherein the candidate networks include heterogeneous wireless networks.

7. The handover apparatus of claim 6, wherein the heterogeneous wireless networks include at least two of WiBro (Wireless Broadband), WiFi (Wireless Fidelity), WiMAX (Worldwide Interoperability for Microwave Access), WCDMA (Wideband Code Division Multiple Access), GSM (Global System for Mobile communication) and WLAN (Wireless Local Area Network).

8. The handover apparatus of claim 5, wherein the history utility function is based on a number of handovers performed so far, the latest connection time, a moving velocity of the mobile terminal, a type of a service by which the user is being served and a type of the serving network.

9. A non-transitory computer-readable storage medium storing a computer-executable program that directs a computer to execute the method of claim 1.

10. A handover method in a plurality of wireless networks, comprising:
    selecting one or more candidate networks from the plurality of wireless networks available to a mobile terminal of a user;

calculating the latest connection time with a serving network currently serving the mobile terminal;

deriving a history utility function based on the latest connection time;

deriving system utility functions of the candidate networks and the serving network in consideration of system environments;

deriving selection functions for the candidate networks and the serving network using the history utility function and the system utility functions;

determining based on the selection functions whether a handover is needed; and selecting one of the candidate networks having the greatest selection function value as a target network for the handover depending on the selection functions if the handover is determined to be needed by the determining, wherein a value of the history utility function for the serving network decreases as the latest connection time increases and a value of the history utility function for wireless networks other than the serving network is zero, wherein the system utility functions indicate satisfaction levels of the user to the respective candidate networks and the serving network and are determined based on the system environments including capacity, delay, path loss and monetary cost of the respective candidate networks and the serving network and user preferences for the system environments, and wherein the selection function for each of the candidate networks is a linear combination of the system utility function for said each of the candidate networks and the history utility function.

11. The handover method of claim 10, wherein the latest connection time indicates the time elapsed to the present time from a completion of a last handover of the mobile terminal to the serving network.

* * * * *